Aug. 22, 1961   J. A. HAMMER   2,997,236

COMPUTER CIRCUIT

Filed June 23, 1959

United States Patent Office 2,997,236
Patented Aug. 22, 1961

2,997,236
COMPUTER CIRCUIT
Jacobus Adriaan Hammer, Noordwijk, Netherlands, assignor to Internationale Navigatie Apparaten N.V., Amsterdam, Netherlands, a limited liability company
Filed June 23, 1959, Ser. No. 822,382
Claims priority, application Netherlands June 23, 1958
2 Claims. (Cl. 235—191)

This invention relates to a computer circuit.

In analogue computers it is often desirable to handle the real and imaginary components of a magnitude in separate channels and to add said components at the end of the operation. Said components often consist of A.C. voltage analogues of the computing quantity and for the sake of simplicity it is desirable to start in both channels with A.C. voltages of equal phase. Since these voltages represent real and imaginary values respectively, they should be shifted in phase over 90° before being added.

For a number of other purposes too, it is desirable to shift two voltages 90° in phase before adding them.

An object of the invention is to provide a simple circuit in which the magnitude of the voltages after phase shifting is substantially independent of the frequency of the voltages.

A further object of the invention is to provide a simple circuit in which the magnitude of the sum of the phase shifted voltages is substantially independent of the frequency of the voltages.

A still further object of the invention is to provide a simple circuit in which the phase of the sum of the phase shifted component voltages is substantially independent of the frequency of said component voltages.

A feature of the invention is the provision of a centertapped source of a first A.C. voltage, loaded by a resistor $R_1$ in series with a capacitor $C_1$, the relation between the capacitor $C_1$ and the resistor $R_1$ being $$C_1 = \frac{\sqrt{2}-1}{2.\pi.f.R_1}$$

in which $f$ is the nominal frequency of the first A.C. voltage and a centertapped source of a second A.C. voltage, loaded by a resistor $R_2$ in series with a capacitor $C_2$, the relation between the capacitor $C_2$ and the resistor $R_2$ being $$C_2 = \frac{1+\sqrt{2}}{2.\pi.f.R_2}$$

in which $f$ is the nominal frequency of the second A.C. voltage, a direct connection being established between any two of the connecting points comprising the centertaps and the junctions of the capacitors to the resistors, the connecting points to which no such connection is made being the output terminals.

Figure 1:
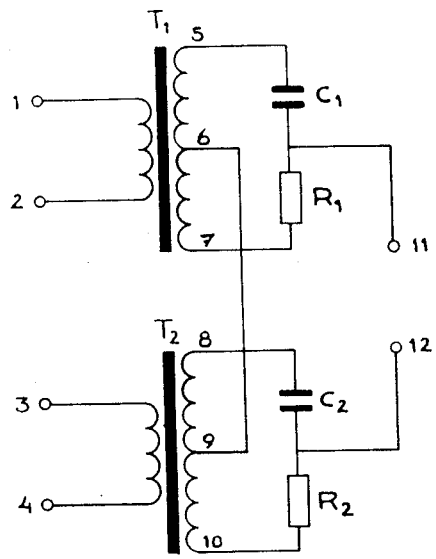
Figure 2:
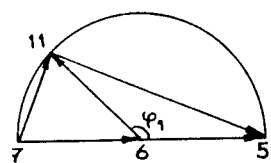
Figure 3:
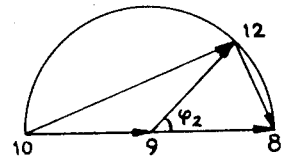

These and other features and advantages will be more apparent after a perusal of the following specification taken in connection with the accompanying drawing, wherein FIG. 1 is an embodiment of a circuit according to the invention and FIGS. 2 and 3 are vector diagrams relating to the operation of a circuit according to FIG. 1.

Referring now to FIG. 1, it is assumed that the circuit shown is intended for use in a computer having separate channels for the real and imaginary components respectively of a computation. In many cases the input signals to both channels will consist of A.C. voltages of equal frequency and phase, the amplitude of said voltages being an analogue of the magnitude of the real and imaginary components respectively. The output voltage of the real channel is delivered to the terminals 1 and 2 and the output voltage of the imaginary voltage is delivered to the terminals 3 and 4. These terminal pairs are connected to the primary windings of two transformers $T_1$ and $T_2$ respectively, both transformers having equal turns ratios. The voltages across the secondary windings with terminals 5, 6, 7 and 8, 9, 10 respectively are shown in FIGS. 2 and 3 respectively. A capacitor $C_1$ in series with a resistor $R_1$ is connected to the secondary winding of the transformer $T_1$. The product $R_1.C_1$ is chosen such that at the nominal frequency $f$ of the input voltage, the voltage of the point 11 with respect to the mid tap 6 makes a phase angle of 135° with the voltage of the point 5 with respect to the mid tap 6.

A capacitor $C_2$ in series with a resistor $R_2$ is connected to the secondary winding of the transformer $T_2$. The product $R_2.C_2$ is here chosen such that at the nominal frequency $f$ the voltage of the point 12 with respect to the mid tap 9 makes a phase angle of 45° with the voltage of the point 8 with respect to the mid tap 9.

Therefore the voltages between the points 6, 11 and 9, 12 respectively will be in phase quadrature.

In order to add them it is obviously merely necessary to connect two of the points 6, 9, 11 and 12 to each other, the remaining points being the output terminals. Thus in the embodiment shown the points 6 and 9 are interconnected and the points 11 and 12 are the output terminals. However, other ways of interconnecting are also possible.

From the vector diagrams it is evident that the magnitudes of the voltages between the points 6, 11 and 9, 12 respectively are independent of the frequency.

Since for the R.C values chosen $$\frac{d\varphi_1}{df} - \frac{d\varphi_2}{df} = 0$$

the magnitude of the voltage between the output terminals will be substantially independent of the frequency. Thus a frequency variation of 10% will influence the magnitude of the output voltage by less than 0.25%.

Similarly, the phase of the output voltage is also substantially independent of the frequency. A frequency variation of 10% will influence the phase angle by less than 20'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A circuit for phase shifting two A.C. voltages 90° with respect to each other and adding the voltages thus phase shifted, comprising a centertapped source of a first A.C. voltage, loaded by a resistor $R_1$ in series with a capacitor $C_1$, the relation between the capacitor $C_1$ and the resistor $R_1$ being $$C_1 = \frac{\sqrt{2}-1}{2.\pi.f.R_1}$$

in which $f$ is the nominal frequency of the first A.C. voltage and a center-tapped source of a second A.C. voltage, loaded by a resistor $R_2$ in series with a capacitor $C_2$, the relation between the capacitor $C_2$ and the resistor $R_2$ being $$C_2 = \frac{1+\sqrt{2}}{2.\pi.f.R_2}$$

in which $f$ is the nominal frequency of the second A.C. voltage, a direct connection being established between any two of the connecting points comprising the centertaps and the junctions of the capacitors to the resistors, the connecting points to which no such connection is made being the output terminals.

2. A circuit for providing a 90° phase shift between two voltages initially in phase comprising a pair of phase shift circuits connected in series, each phase shift circuit comprising a center tapped winding having a resistor and a condenser connected in series across said winding, each phase shift circuit having terminals comprising the center tap of the winding and the junction between the resistor and condenser, said resistors and condensers being arranged such that one of said phase shift circuits provides a phase shift of approximately 45° and the other provides a phase shift of approximately 135° whereby both phase shifts vary in approximately equal amounts in the same direction with changes in frequency of the voltages.

References Cited in the file of this patent

Hindall et al.: Circuit Adds Vectors, Radio-Electronics (February 1951), pps. 76 and 77.

UNITED STATES PATENT OFFICE
CERTIFICATE OF CORRECTION

Patent No. 2,997,236                          August 22, 1961

Jacobus Adriaan Hammer

It is hereby certified that error appears in the above numbered patent requiring correction and that the said Letters Patent should read as corrected below.

Column 2, lines 32 and 33, for $$\frac{d\varphi}{df} - \frac{d\varphi_2}{df} = 0 \quad \text{read} \quad \frac{d\varphi_1}{df} - \frac{d\varphi_2}{df} = 0$$

Signed and sealed this 9th day of January 1962.

(SEAL)
Attest:

ERNEST W. SWIDER                          DAVID L. LADD
Attesting Officer                              Commissioner of Patent